United States Patent [19]
Solomon et al.

[11] Patent Number: 5,918,076
[45] Date of Patent: Jun. 29, 1999

[54] ONE-TIME-USE CAMERA WITH TEAR LEAD-IN TO FRACTURE LINE FOR BREAK-OPEN DOOR

[75] Inventors: Jeffrey A. Solomon, Spencerport; Douglas H. Pearson, Rochester, both of N.Y.

[73] Assignee: Eastman Kodak Company, Rochester, N.Y.

[21] Appl. No.: 09/023,154

[22] Filed: Feb. 12, 1998

[51] Int. Cl.⁶ .................................................. G03B 17/24
[52] U.S. Cl. ................................................ 396/6; 396/536
[58] Field of Search ................................ 396/6, 535, 536, 396/538

[56] References Cited

U.S. PATENT DOCUMENTS

| | | | |
|---|---|---|---|
| 5,063,400 | 11/1991 | Takei et al. | 396/6 |
| 5,146,255 | 9/1992 | Nakai et al. | 396/6 |
| 5,384,613 | 1/1995 | Cloutier et al. | 396/6 |
| 5,517,270 | 5/1996 | Balling | 396/6 |
| 5,581,321 | 12/1996 | Boyd | 396/6 |

*Primary Examiner*—David M. Gray
*Attorney, Agent, or Firm*—Roger A. Fields

[57] ABSTRACT

A one-time-use camera provided with an opaque cover part comprising a door portion and a remaining portion, a line of weakness between the door portion and the remaining portion that allows the door portion to be pivoted along the line of weakness to open the door portion, and a pair of lead-in slots between the door portion and the remaining portion each having an open lead-in end and an opposite end that is closed at the line of weakness to facilitate pivoting the door portion to be opened, is characterized in that the slots are partially filled between their open and closed ends with opaque tear substances that are thin enough to be readily ripped, from the open ends of the slots to the closed ends of the slots, when the door portion is pivoted along the line of weakness to be opened.

4 Claims, 6 Drawing Sheets

ONE-TIME-USE CAMERA WITH TEAR LEAD-IN TO FRACTURE LINE FOR BREAK-OPEN DOOR

FIELD OF THE INVENTION

The invention relates generally to the field of photography, and in particular to one-time-use cameras. More specifically, the invention relates to a one-time-use camera having a fracture line or line of weakness that permits a break-open door to be forcibly opened.

BACKGROUND OF THE INVENTION

Film and cameras that are all in one, commonly referred to as single-use or one-time-use cameras, have become well known. The one-time-use camera is a simple point-and-shoot type comprising a plastic main body part which supports a conventional film cartridge in a cartridge receiving chamber, a film take-up spool in a film supply chamber, a fixed-focus taking lens, a film metering mechanism with a rotatably supported metering sprocket that engages the filmstrip, a manually rotatable thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of opaque plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Prior Art Problem

There is a problem in the recycling, i.e. reuse, of used camera parts, in that the reused parts may become worn or damaged. Thus, it has been suggested that any worn or damaged parts be purposely fractured to render them detectably different, during disassembly of the one-time-use camera to retrieve the exposed film. This allows the worn or damaged parts to be readily identified to be discarded, and prevents them from being erroneously reused.

One implementation of a possible solution to the problem involves the rear cover part of the one-time-use camera. The rear cover part may have an integral door portion that is to be opened to remove a used battery from a battery receiving chamber in the main body part. See U.S. Pat. No. 5,581,321 issued Dec. 3, 1996. A fracture line or grooved line of weakness in the rear cover part between the door portion and a remaining portion of the rear cover part permits the door portion to be pivoted along the line of weakness to open the door portion. A pair of parallel slots between the door portion and the remaining portion each have an open lead-in end and an opposite end that is closed at the line of weakness. The slots facilitate pivoting the door portion along the line of weakness, when one grasps the door portion between the open ends of the slots to forcibly open the door portion. However, the slots may possibly allow the door portion to be unintentionally opened and detract from the camera appearance.

Another implementation of a possible solution to the problem is disclosed in U.S. Pat. No. 5,063,400 issued Nov. 5, 1991. Here, a circular grooved tear-line in the rear cover part of the one-time-use camera surrounds a bottom cover for the cartridge receiving chamber. An integral pull-tab of the bottom cover is manually grasped to tear the bottom cover completely away from the rear cover part, to open the cartridge receiving chamber.

SUMMARY OF THE INVENTION

An opaque cover part for a one-time-use camera comprising a door portion and a remaining portion, a line of weakness between the door portion and the remaining portion that allows the door portion to be pivoted along the line of weakness to open the door portion, and at least one slot having an open lead-in end and an opposite end that is closed at the line of weakness to facilitate pivoting the door portion to be opened, is characterized in that:

the slot is partially filled between its open and closed ends with an opaque tear substance that is thin enough to be readily ripped when the door portion is pivoted along the line of weakness to be opened. The tear strip prevents the door portion from being unintentionally opened and adds to the camera appearance.

DETAILED DESCRIPTION OF THE INVENTION

The invention is disclosed as being embodied preferably in a one-time-use camera. Because the features of a onetime-use camera are generally known, the description which follows is directed in particular only to those elements forming part of or cooperating directly with the disclosed embodiment. It is to be understood, however, that other elements may take various forms known to a person of ordinary skill in the art.

Figure 1:
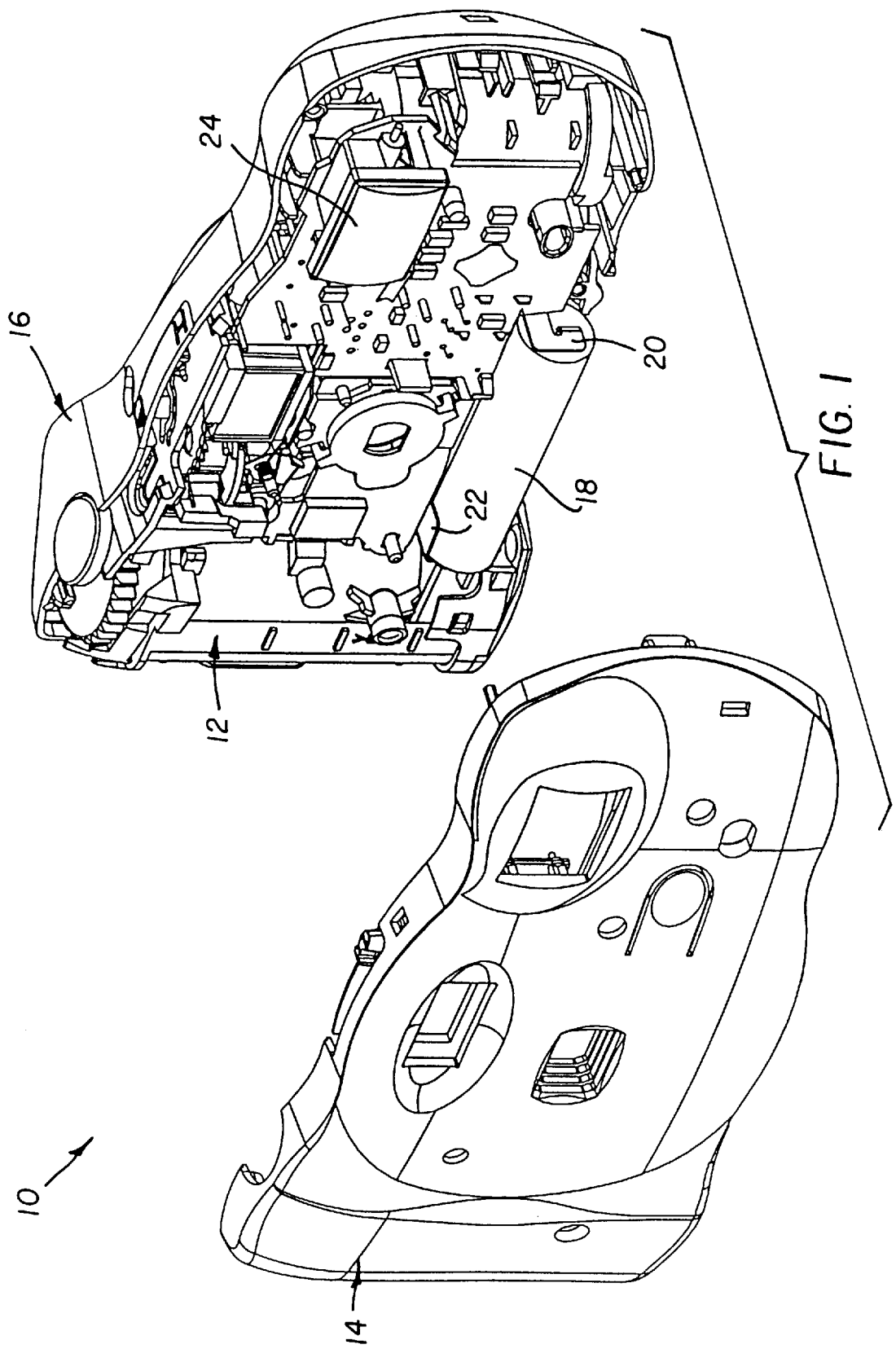
FIG. 1 is a front exploded perspective view of a one-time-use camera according to a preferred embodiment of the invention, showing a front cover part separated from a main body part.
Figure 2:
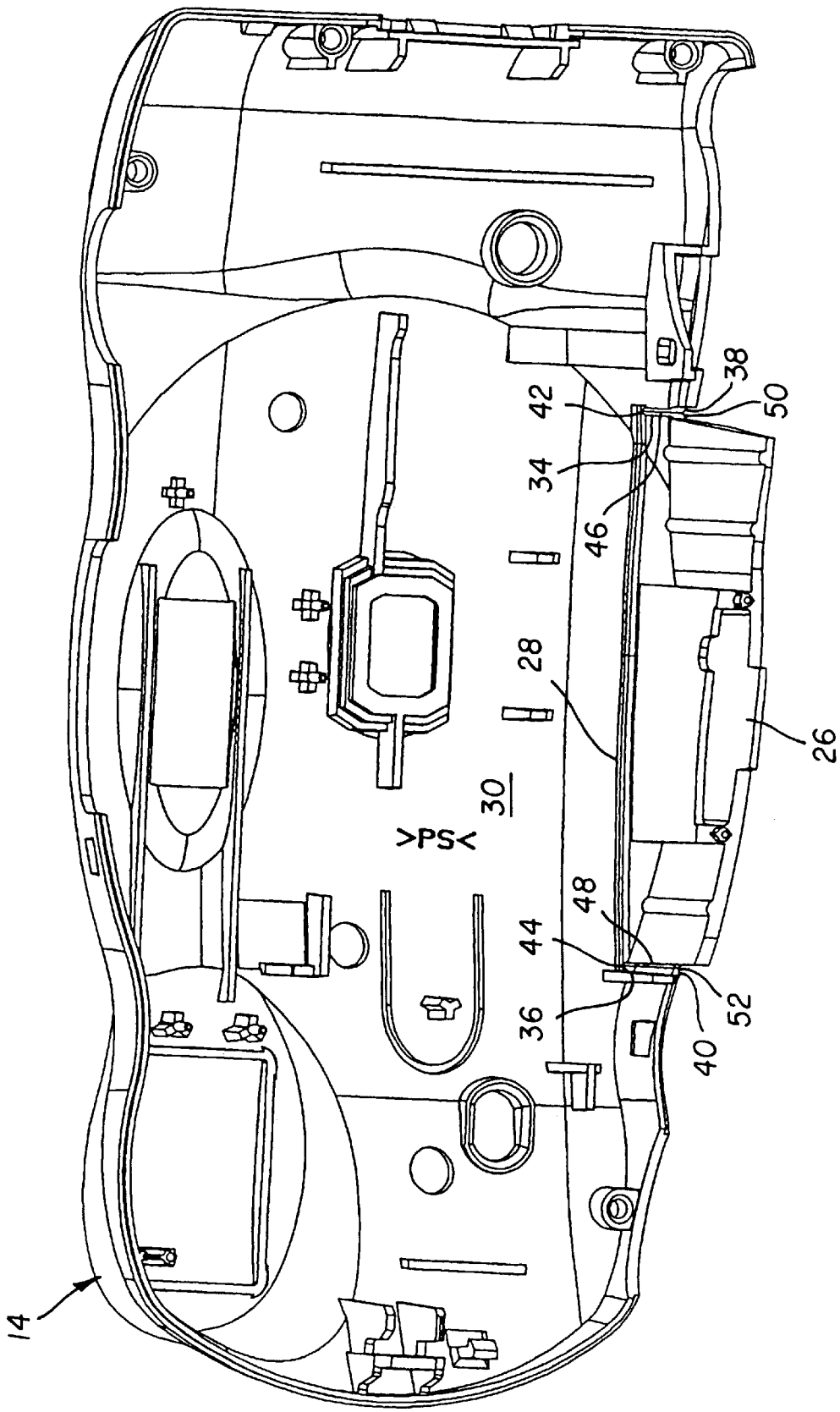
FIG. 2 is a perspective view of the front cover part shown from its inner side.
Figure 3:
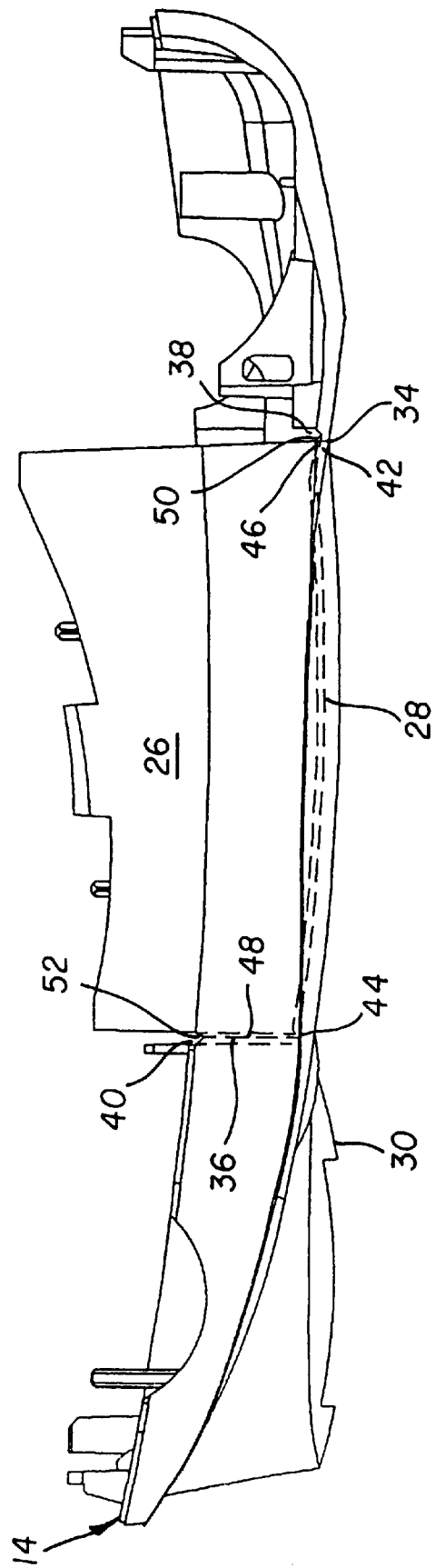
FIG. 3 is a bottom plan view of the front cover part shown from its outer side.
Figure 4:
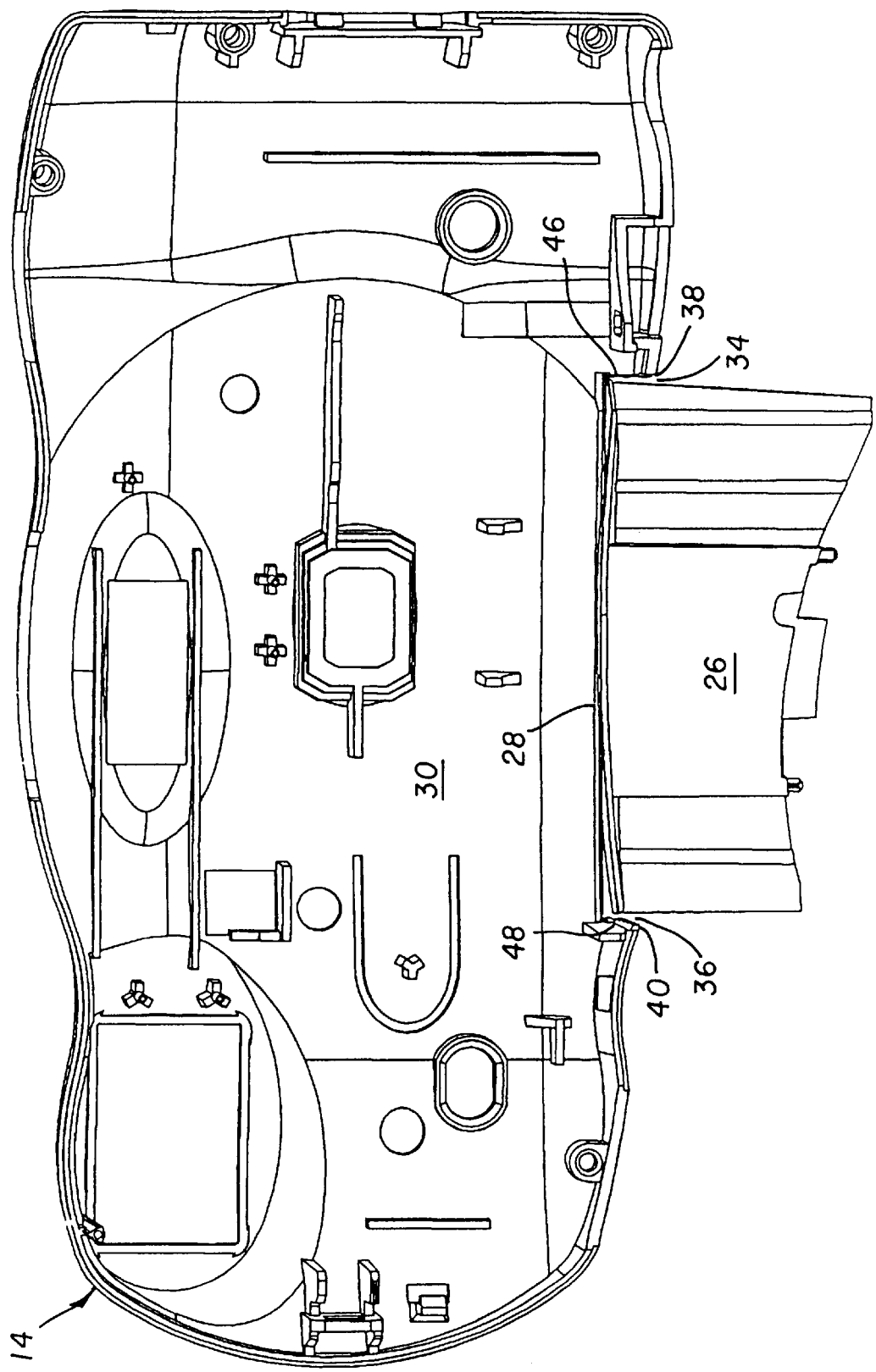
FIG. 4 is a perspective view similar to FIG. 2, but shown with a door portion opened.
Figure 5:
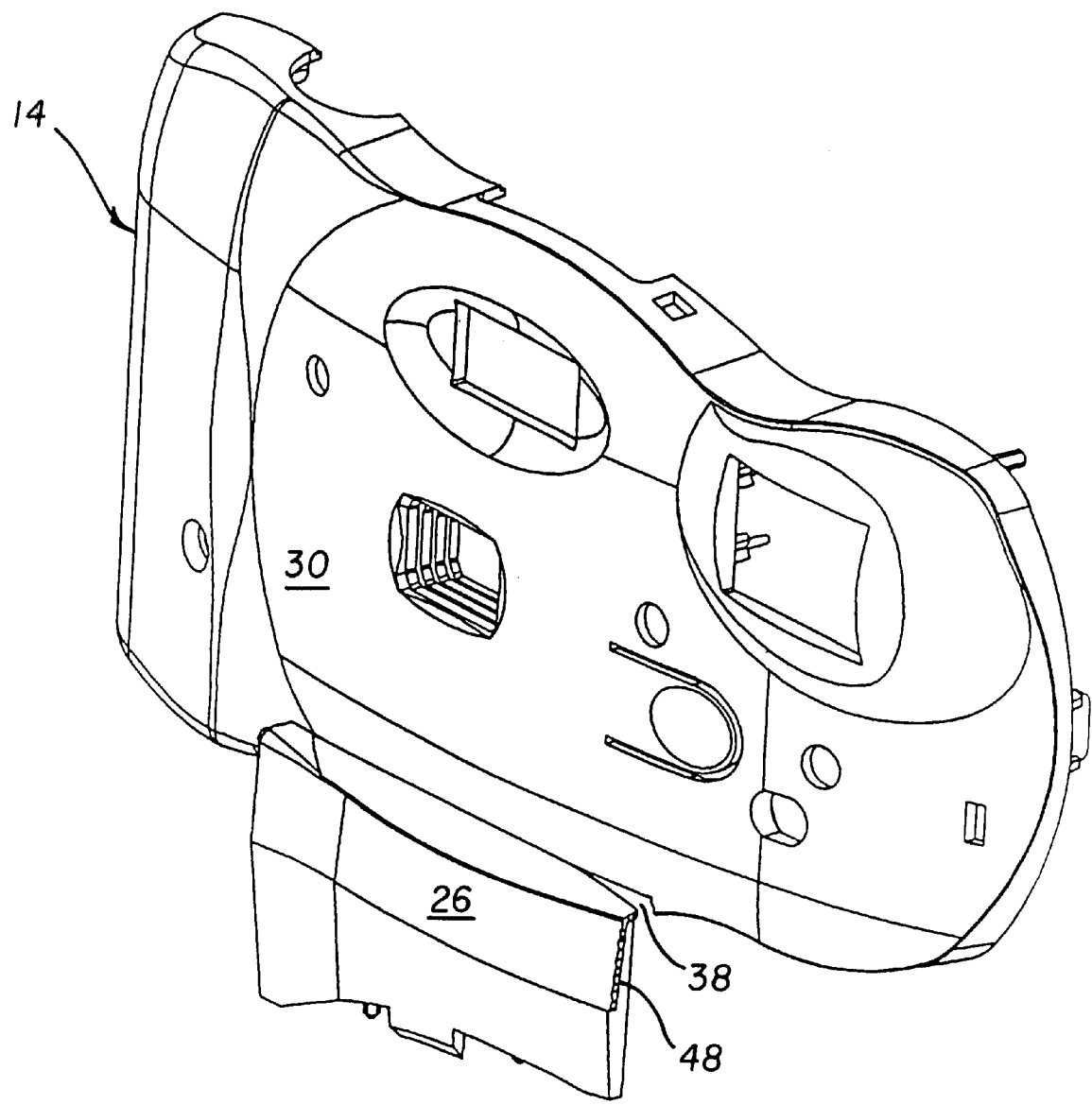
FIG. 5 is a perspective view of the front cover part shown from its outer side and with the door portion opened.

Referring now to the drawings, FIG. 1 shows a one-time-use camera 10 comprising an opaque plastic main body part 12 and a pair of opaque front and rear cover parts 14 and 16 that house the main body part between them.

A battery 18 is held between a pair of resilient metal contacts 20 and 22 for powering an electronic flash 24 on the main body part 12.

As shown in FIGS. 2–5, the front cover part 14 has an integral door portion 26 that is to be opened to remove the battery 18 from between the two resilient contacts 20 and 22 in order to discard the battery.

Figure 6:
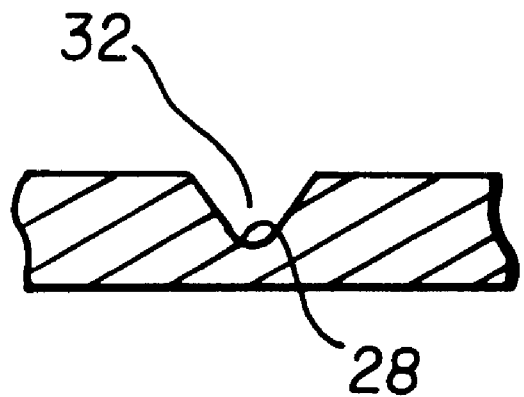
FIG. 6 is a section view showing a fracture line or grooved line of weakness between the door portion and a remaining portion of the front cover part.

A fracture line or grooved line of weakness 28 in the front cover part 14 between the door portion 26 and a larger remaining portion 30 of the rear cover part permits the door portion to be pivoted along the line of weakness to open the door portion. See FIGS. 4 and 5. A v-shaped groove 32 forms the line of weakness 28. See FIG. 6.

Figure 7:
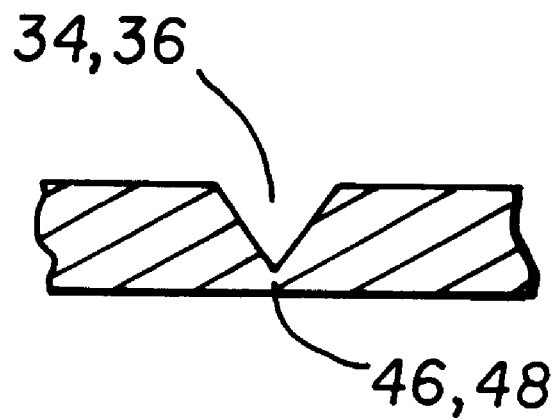
FIG. 7 is a section view of a tear substance that is ripped when the door portion is opened.

A pair of slots 34 and 36 between the door portion 26 and the remaining portion 30 have respective open lead-in ends 38 and 40 and opposite ends 42 and 44 that are closed at the line of weakness 28. See FIGS. 2, 3 and 7. The slots 34 and 36 facilitate pivoting the door portion 26 along the line of weakness 28, when one grasps the door portion between the open ends 38 and 40 of the slots to forcibly open the door portion.

According to the invention, the slot 34 is partially filled between its open and closed ends 38 and 42 with an opaque tear strip or membrane-like substance 46 and the slot 36 is partially filled between its open and closed ends 40 and 44 with a similar tear strip 48. See FIGS. 2, 3 and 7. The tear strips 46 and 48 are each thin enough to be readily ripped, from the open ends 38 and 40 to the closed ends 42 and 44 of the slots 34 and 36, when the door portion 26 is pivoted along the line of weakness 28 to forcibly open the door portion. See FIGS. 4 and 5. As can be seen by comparing FIGS. 6 and 7, the tear strips 46 and 48 are very thin as contrasted with the line of weakness 28. Respective notches 50 and 52 are provided in the tear strips 46 and 48 at the open ends 38 and 40 of the slots 34 and 36 to facilitate beginning to rip the tear strips.

The term "ripped" as used in connection with the tear strips 46 and 48 is given its plain and ordinary meaning, "to pull apart in one uninterrupted motion along a seam or joint".

The invention has been described with reference to a preferred embodiment. However, it will be appreciated that variations and modifications can be effected by a person of ordinary skill in the art without departing from the scope of the invention.

PARTS LIST

| | |
|---|---|
| 10. | one-time-use camera |
| 12. | main body part |
| 14. | front cover part |
| 16. | rear cover part |
| 18. | battery |
| 20. | resilient contact |

-continued

PARTS LIST

| | |
|---|---|
| 22. | resilient contact |
| 24. | electronic flash |
| 26. | door portion |
| 28. | fracture line or grooved line of weakness |
| 30. | remaining portion |
| 32. | v-shaped groove |
| 34. | slot |
| 36. | slot |
| 38. | open end |
| 40. | open end |
| 42. | closed end |
| 44. | closed end |
| 46. | tear strip or substance |
| 48. | tear strip or substance |
| 50. | notch |
| 52. | notch |

What is claimed is:

1. An opaque cover part for a one-time-use camera comprising a door portion and a remaining portion, a line of weakness between said door portion and said remaining portion that allows said door portion to be pivoted along said line of weakness to open the door portion, and at least one slot having an open lead-in end and an opposite end that is closed at said line of weakness to facilitate pivoting the door portion to be opened, is characterized in that:

said slot is partially filled between its open and closed ends with an opaque tear substance that is thinner than said line of weakness to be readily ripped when said door portion is pivoted along said line of weakness to be opened.

2. An opaque cover part as recited in claim 1, wherein said tear substance has a notch at said open end of the slot to facilitate beginning to rip the tear substance.

3. A one-time-use camera provided with an opaque cover part comprising a door portion and a remaining portion, a line of weakness between said door portion and said remaining portion that allows said door portion to be pivoted along said line of weakness to open the door portion, and a pair of lead-in slots between said door portion and said remaining portion each having an open lead-in end and an opposite end that is closed at said line of weakness to facilitate pivoting the door portion to be opened, is characterized in that:

said slots are partially filled between their open and closed ends with opaque tear substances that are thinner than said line of weakness to be readily ripped, from said open ends of the slots to said closed ends of the slots, when said door portion is pivoted along said line of weakness to be opened.

4. A method of opening a one-time-use camera provided with an opaque cover part including a door portion and a remaining portion, a line of weakness between the door portion and the remaining portion that allows the door portion to be pivoted along the line of weakness to be opened, and a pair of slots between the door portion and the remaining portion each having an open lead-in end and an opposite end that is closed at the line of weakness to facilitate pivoting the door portion to be opened, said method comprising the steps of:

pivoting the door portion along the line of weakness to open the door portion; and ripping a thin opaque substance that partially fills the slots between their open and closed ends and is thinner than the line of weakness, as the door portion is pivoted.

* * * * *